W. A. ROSS.
ARMORED MOTOR CAR.
APPLICATION FILED SEPT. 12, 1916.
1,358,579.
Patented Nov. 9, 1920.
4 SHEETS—SHEET 1.
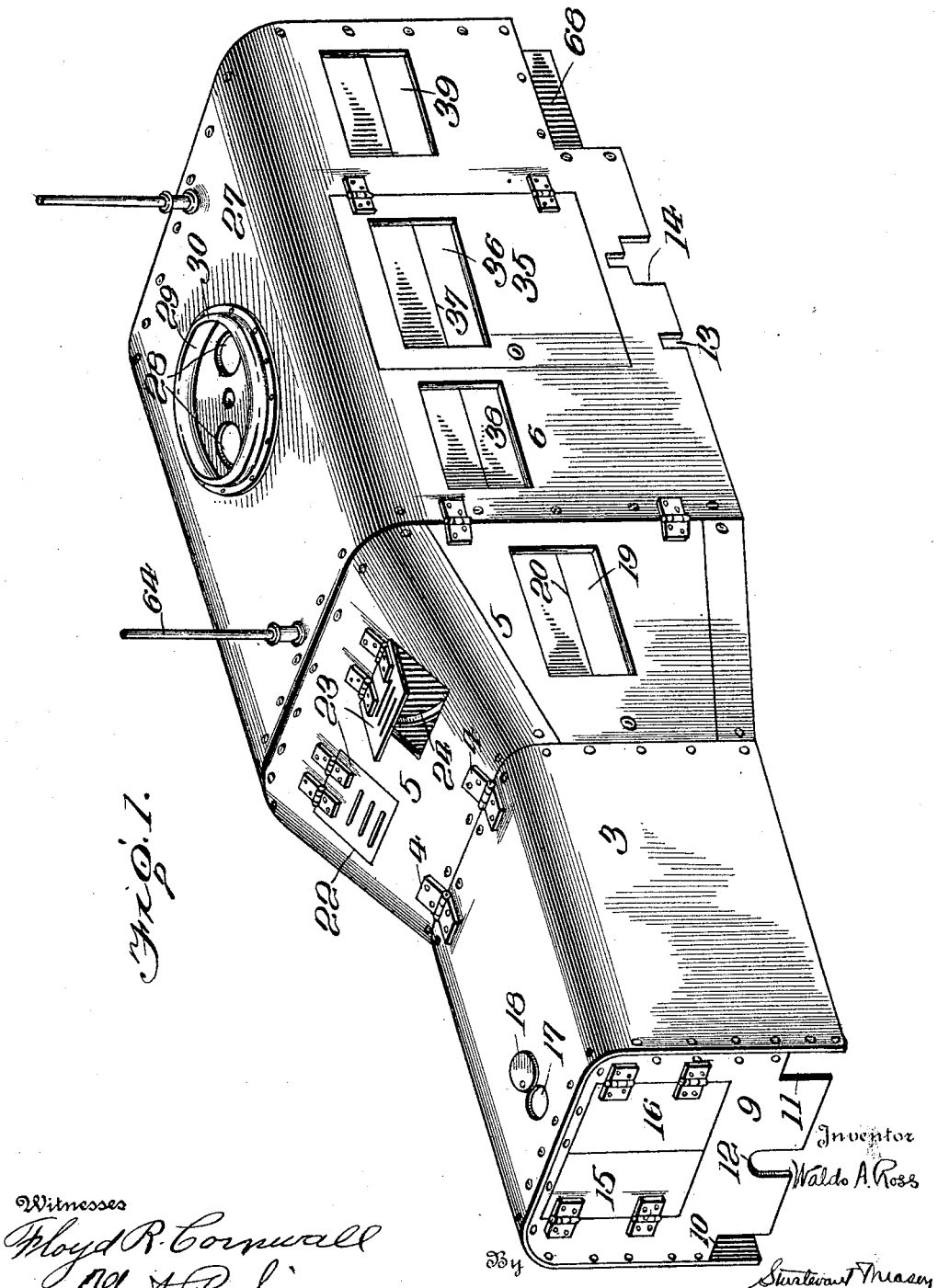

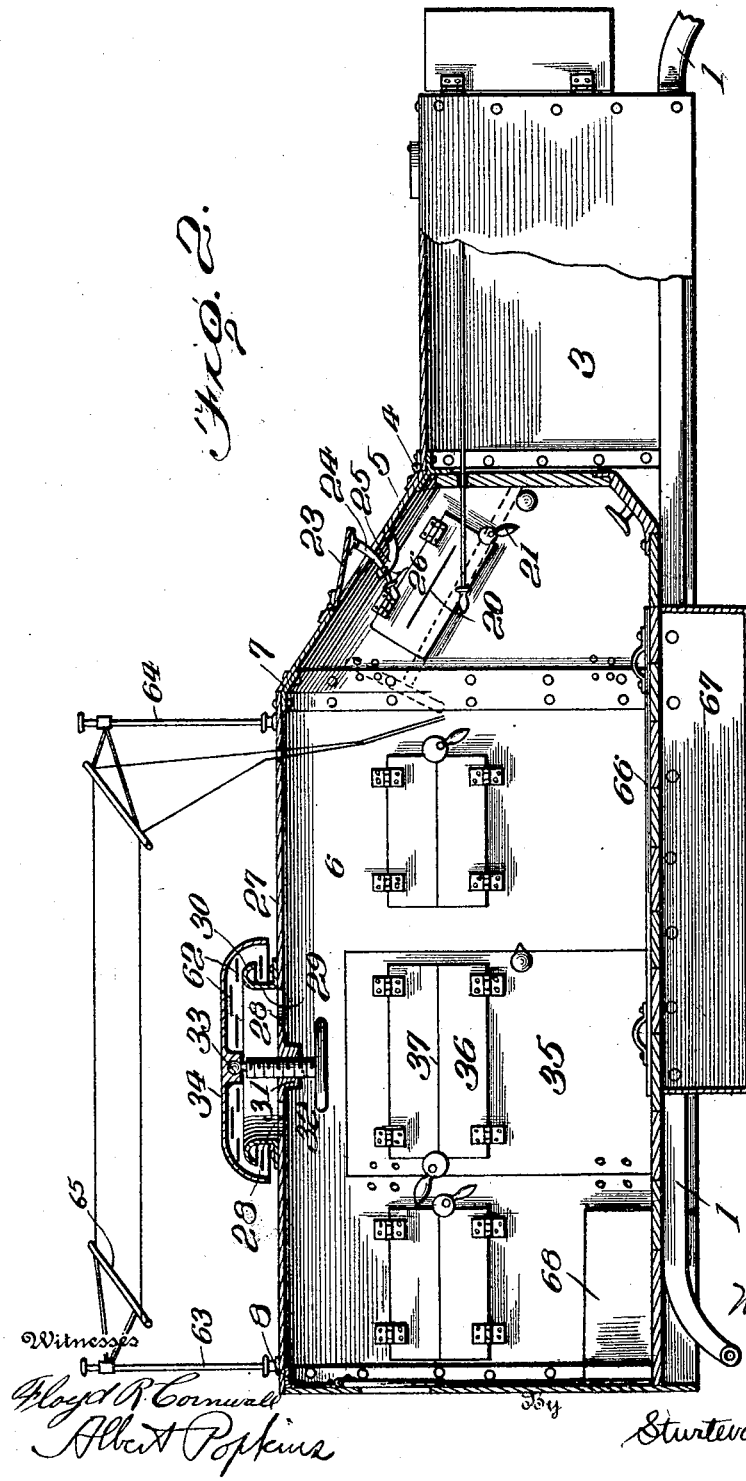

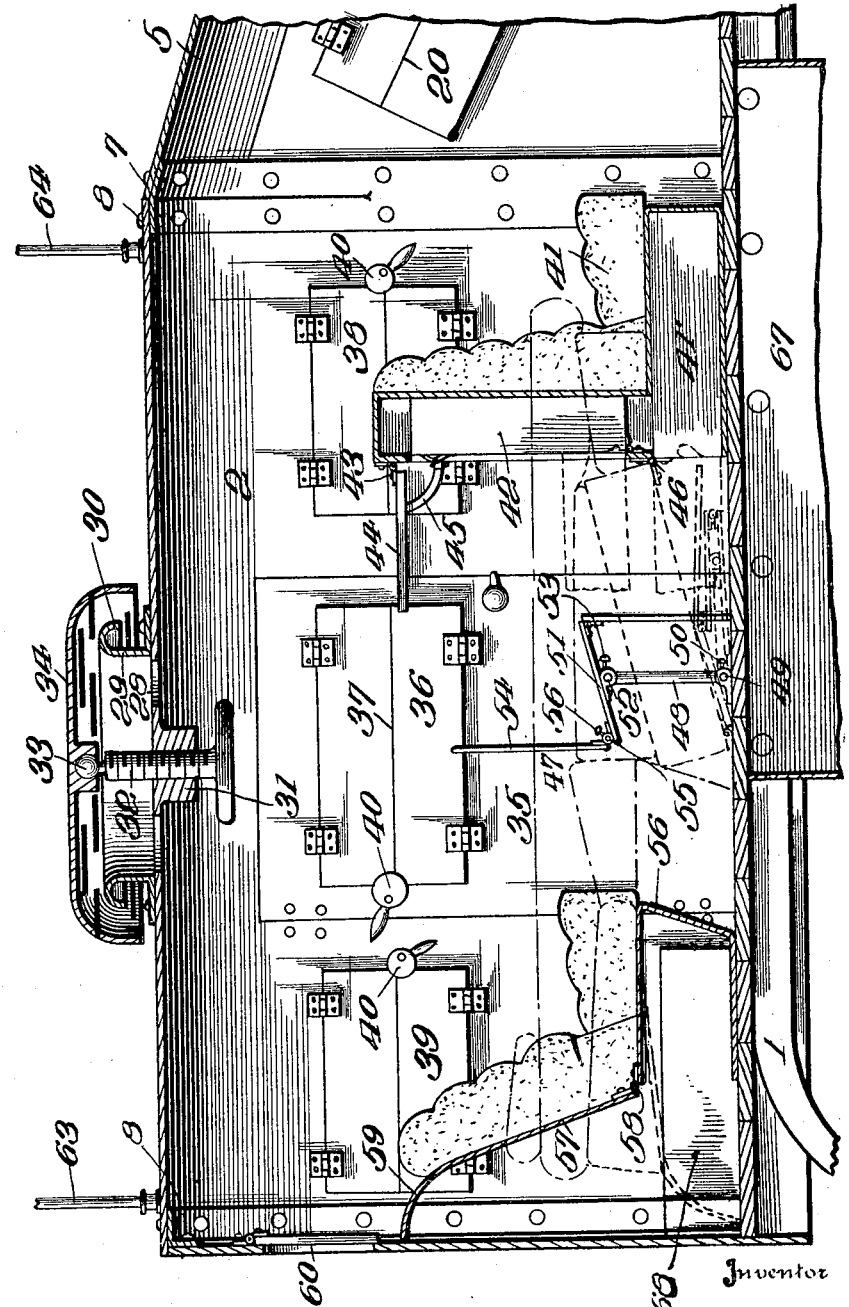

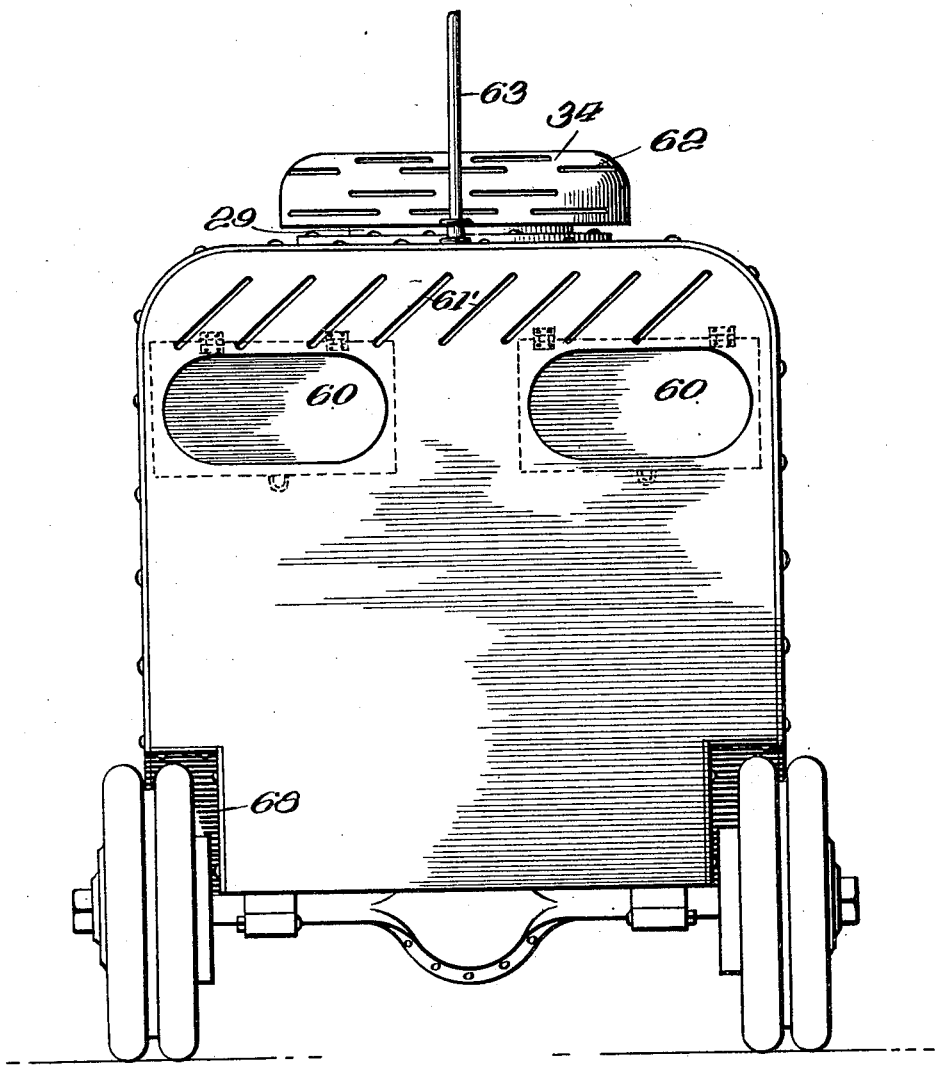

UNITED STATES PATENT OFFICE.

WALDO A. ROSS, OF SIOUX FALLS, SOUTH DAKOTA, ASSIGNOR TO THE ARMORED MOTOR CAR COMPANY, INCORPORATED, OF DETROIT, MICHIGAN, A CORPORATION OF MICHIGAN.

ARMORED MOTOR-CAR.

1,358,579.

Specification of Letters Patent.

Patented Nov. 9, 1920.

Application filed September 12, 1916. Serial No. 119,678.

*To all whom it may concern:*

Be it known that I, WALDO A. Ross, a citizen of the United States, residing at Sioux Falls, in the county of Minnehaha, State of South Dakota, have invented certain new and useful Improvements in Armored Motor-Cars, of which the following is a description, reference being had to the accompanying drawing and to the figures of reference marked thereon.

The invention relates to improvements in armored motor cars.

The object of the invention is to provide a motor car of this character in which an armored housing is so constructed that it can be placed upon the chassis of the ordinary motor-vehicle and fully protect the working parts of the car and its occupants, and providing means of observation for the occupants of the car.

Another object of my invention is to provide a car of this character in which the body is broadened out to form a larger carrying capacity and having seats so constructed that they can be folded down and the entire bottom of the car forming a bed for sleeping purposes.

Another object of my invention is to provide a simple, cheap and effective armored car of this character having certain details of structure and operation and combination of parts hereinafter more fully shown and described in the drawings and specification.

In the accompanying drawings:—

Figure 1 is a perspective view of the armored housing removed from the chassis of the automobile;

Fig. 2 is a longitudinal vertical sectional view of the housing;

Fig. 3 is an enlarged vertical sectional view of the rear portion of the housing showing the seats in dotted lines in their folded position, and also showing the mattress in dotted lines;

Fig. 4 is a rear end view of the motor car.

Referring more in detail to the drawings, 1 represents the chassis of an ordinary motor car, and 2 represents the armored housing which, as shown, rests upon the chassis and is readily placed upon or removed therefrom, yet at the same time it is rigidly supported so as to carry considerable weight in the way of passengers. The armored housing, as clearly shown in Fig. 1 of the drawings, consists of a forward reduced portion 3 which covers the engine and which is hinged at 4 to one of the slanting walls 5 forming a continuation of said walls which is connected to the main body portion 6. This housing is constructed of angle irons 7 and armored plates 8, all of which is shown in my application filed August 14, 1916, Serial No. 114,744, and, therefore, the specific manner of forming the same will not be further described herein.

The portion 3 of the housing covers the engine and radiator and has its forward end 9 at each side provided with a cut-away portion 10 and 11 through which the chassis passes and by means of which the housing extends below the same and is held against lateral movement on the chassis. The end 9 is also provided with a central cut-away portion 12 through which the crank extends and whereby the engine is started. The sides of the main frame 6 are cut-away, as indicated at 13 and 14, to allow for the springs, as clearly shown in the application heretofore referred to. The end 9 is provided with hinged shutters 15 and 16 which can be opened to allow the air to pass to the radiator for cooling the engine, all of which is well understood. The top of the portion 3 is provided with an opening 17 which is arranged directly above the filling opening of the radiator, so that water can be supplied to the radiator and said opening is closed by a cover 18.

The slanting walls 5 at the sides are provided with openings, closed by inwardly hinged shutters 19 having slits 20 therein and whereby the operator of the car can see out, if the shutters are opened or closed. These shutters are preferably held closed by cam members 21 fully shown in Fig. 2 of the drawings. The upper slanting wall is provided with openings or windows 22 closed by outwardly hinged shutters 23 having the segmental bars 24 connected thereto and passing through guideways 25 having set-screws 26 for holding the shutters in their adjusted positions.

The main body portion is provided with flat top 27 having a ventilating opening 28 and arranged around the opening is an upwardly extending flange 29 riveted or otherwise secured to the top. The upper end of the flange is turned outwardly and downwardly at 30 so that a bullet striking the flange will be diverted downwardly. Extending across the opening is a web 31 through which is screwed the hand screw 32 which has a ball and socket connection 33 with the dome 34 which covers the opening. The said dome is of an inverted saucer shape having its downwardly turned edge on the outside of the flange and by which structure it is impossible for a bullet to pass into the car yet allowing of the passage of air therefrom.

One side of the main body is provided with a door 35 hinged to swing outwardly and provided with a hinged shutter 36 which is made in two sections swinging inwardly and directed horizontally, as shown in Figs. 1 and 2. The sections are so arranged that a tight joint is not formed, thus leaving a space 37 between the same and by means of which observations may be taken from within the machine, yet said space is not of a width sufficient to allow the bullets to pass therethrough. The sides of the housing are provided with shutters 38 and 39 arranged on each side of the door and formed exactly like the shutters in the door and held closed by the cam members 40.

Within the forward end of the main body 6 of the car is a seat 41 having the back 42 in the form of a box and forming a drawer for the reception of maps and the like. The back has hinged at 43 the folding desk 44 supported by the bracket 45 and by means of which the table is held in its longitudinal position for writing purposes. The back is hinged at 46 so that it can fold down in the position shown in dotted lines in Fig. 3 of the drawings. In rear of the back of the forward or operator's seat is a folding stool 47 arranged convenient to the desk so that the occupant of the seat can write upon the desk. This seat consists of a pedestal 48 hinged at 49 and held in its vertical position by means of set-screws 50, and the upper end of the pedestal has the seat 51 pivoted at 52 and held in its horizontal position by means of set-screws or thumb-screws 53. The back 54 is hinged at 55 to the seat and held by a setscrew so that the whole stool can be folded down into the position shown in dotted lines in Fig. 3, the purpose of which will be later described. Within the seat 41 is a drawer 41', as shown, which may receive the mattress.

In rear of the stool is the rear seat which is carried by a sliding base 56 which slides forward and the back 57 is hinged at 58 so that it swings downward and is provided with a downwardly curved portion 59 which engages the floor when the back is folded down and supports it in a horizontal position and the cushions of the front and rear seats are arranged as shown, which forms practically a flat horizontal bed. Upon the cushion is arranged the mattress and whereby a comfortable bed is formed completely covering the bottom of the main body of the car.

The rear end of the main body of the car is provided with windows closed by the shutters 60 which may or may not have slots the same as the other shutters, and above the windows are diagonally arranged slots 61' so as to provide for more ventilation. The dome 34 is provided with slits 62 arranged horizontally around all sides for ventilating purposes. The top 2 of the main body portion is provided with poles 63 and 64 which are arranged at the ends and having the wireless apparatus 65 connected thereto, as clearly shown in Fig. 2 of the drawings.

The floor of the car is provided with trap doors 66 which communicate with the compartment 67 carried by the lower face of the bottom or floor and in which the mattress or other articles can be stored. The body of the car extends out beyond the rear wheels and is cut-away at 68, as shown in Figs. 1 and 4 to allow for the wheels and whereby a broader body is obtained.

From the foregoing description, it will be seen that I have produced an armored motor car in which the engine and occupants of the car are fully protected and at the same time providing ample ventilation for the occupants of the car when it is closed up under fire and providing a table upon which the necessary business can be carried on. I also provide a car in which accommodations are provided for a large number while traveling and also providing sleeping accommodations for all on board the car. I also provide a wireless so that communications can be kept with the remainder of the army and also provide for observation in any direction without exposing the occupants of the car.

It is obvious that minor changes in the details of construction and the arrangement of parts may be made without departing from the spirit of this invention, as set forth in the appended claims.

Having thus described the invention, what is claimed as new is:—

1. In an armored car of the character described, the combination with the chassis of a motor vehicle, of an armored housing supported by the chassis, and having an opening in its upper end, an upwardly extending flange surrounding the opening, and a dome above the opening having horizontally arranged slits and having its lower end below the upper end of the flange.

2. In an armored car of the character described, the combination with the chassis of a motor vehicle, of an armored housing supported by the chassis and having an opening in its upper end, an upwardly extending flange surrounding the opening and having its upper end turned downwardly, and a dome above the opening having horizontally arranged slits and having its outer edge extending downwardly below the upper end of the flange.

3. In an armored car of the character described, the combination with the chassis of a motor vehicle, of an armored housing supported by the chassis and having an opening in its upper end, an upwardly extending flange surrounding the opening and having its upper end turned downwardly, and a dome vertically movable above the opening having horizontally arranged slits and having its outer edge extending downwardly below the upper end of the flange.

4. In an armored car of the character described, the combination with the chassis of a motor vehicle, of a housing covering the engine and having a rear passenger and driver compartment, doors in the forward end of the housing opposite the radiator, a door in the side of the passenger compartment, windows in all the sides of the compartment, shutters closing the windows and having bullet-proof observation slits therein, a bullet-proof ventilator carried by the upper end of the compartment, and a wireless apparatus supported by the upper end of the housing.

In testimony whereof, I affix my signature, in the presence of two witnesses.

WALDO A. ROSS.

Witnesses:
E. G. MASON,
ROSINA T. FINOTTI.